United States Patent [19]

Taylor, Jr.

[11] 4,301,608
[45] Nov. 24, 1981

[54] PHOTOGRAPHIC INSTRUCTION CARD HOLDER

[76] Inventor: Herbert N. Taylor, Jr., 10 Washington St., Hempstead, N.Y. 11550

[21] Appl. No.: 16,357

[22] Filed: Mar. 1, 1979

[51] Int. Cl.³ .............................................. G09F 3/18
[52] U.S. Cl. .................................... 40/16.4; 40/10 D
[58] Field of Search ................. 40/10 D, 10 R, 16.4, 40/17

[56] References Cited

U.S. PATENT DOCUMENTS

| 225,045 | 3/1880 | Bishop | 40/16.4 |
| 485,310 | 11/1892 | Wheeler | 40/17 |
| 884,573 | 4/1908 | Detmers | 40/16.4 |
| 1,313,659 | 8/1919 | Wonder | 40/17 |
| 1,357,085 | 10/1920 | Smith | 40/10 R |
| 2,409,814 | 10/1946 | Vargish | 40/10 D |
| 2,595,530 | 5/1952 | Jefner | 40/16.4 |
| 2,626,567 | 1/1953 | Vogt | 40/17 |
| 2,951,301 | 9/1960 | Slavsky | 40/17 |
| 3,209,757 | 10/1965 | Littler | 40/10 D |
| 3,452,463 | 7/1969 | Chaput | 40/17 |

OTHER PUBLICATIONS

"Underwater Photographer", Mar. 1978, p. 44, section showing advertisement for camera slate.

Primary Examiner—Gene Mancene
Assistant Examiner—Wenceslao J. Contreras
Attorney, Agent, or Firm—Robert L. Stone

[57] ABSTRACT

A card holder comprising a single-piece transparent material having a rear face and folded therefrom and in close proximity thereto a front face; and projecting from the end of one of said faces a section of said transparent material adapted to engage with the body of camera. The projecting section typically may have a hole into which a tripod or camera case screw can be placed or may slide into an accessory shoe or flash attachment shoe.

9 Claims, 7 Drawing Figures

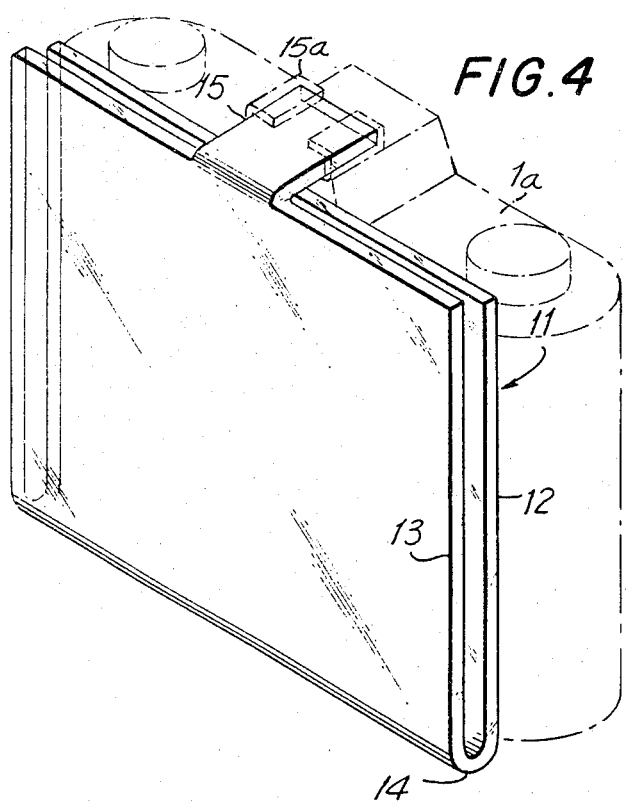
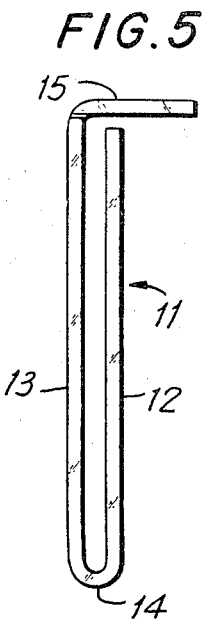
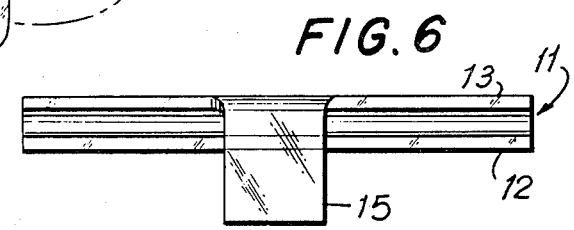
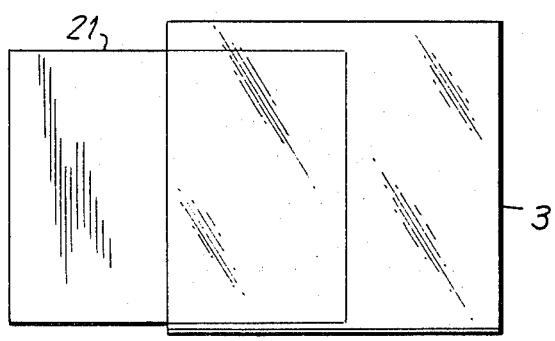
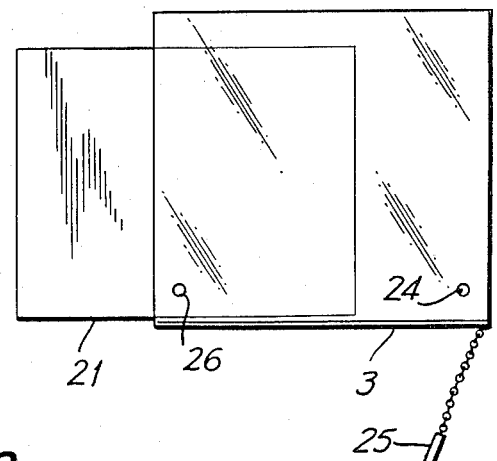
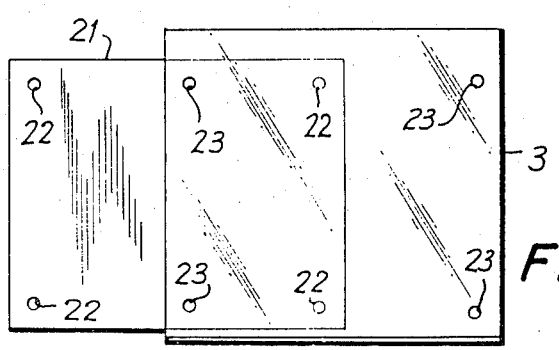

PHOTOGRAPHIC INSTRUCTION CARD HOLDER

This invention relates to a device for conveying instructions for operating a camera in a manner to provide optimal following of instructions.

Photography is a popular profession and hobby. Successful use of cameras requires the following of instructions. For specialized cameras such as reflex cameras, view cameras and cameras adapted for underwater photography, and for other specialized subject areas, such as close-up photography, high speed photography or other technical subjects, the instructions may be complex and care must be exercised in learning and reviewing the steps necessary to get good photographs. Furthermore, in some environments, such as underwater, the normal thinking and movement processes of the photographer may be slowed and the ability to follow required procedures made more difficult.

Thus, problems can arise when a photographer must learn or review instructions and then put them aside in order to start taking pictures. As successive pictures are taken the photographer can easily overlook parts of a checklist, forget to adjust for focus or light conditions, select an inappropriate shutter speed, or use the flash in an incorrect manner, as well as possibly making other errors. Such difficulties are even more likely to occur in underwater photography where because of difficulties in operating outside of normal human environment, elementary instructions are easily forgotten and corrections can be made only with difficulty.

It has been proposed to attach a slate to a camera with clips, particularly spring tension clips. Written instructions could be provided on the slate. This can be used underwater. However, compared with the present invention, the combination of slate and clips has substantial disadvantages. Only a single set of instructions can be provided with a slate while a card holder is adapted to receive cards in a series. Furthermore, the structure of a camera is such that clips on its sides do not provide a sturdy means of attachment. It could be possible to have the clips adapted to fit around the lens; but this would substantially limit the ability to adjust the camera as the clips would be attached to at least one lens ring.

SUMMARY OF THE INVENTION

It is an advantage of this invention that a device is provided which can be attached directly to a camera, into which device written and/or illustrated indicia can be inserted which a photographer can see while preparing to take a picture. Other objects will be apparent from consideration of the following specification.

In accordance with certain of its aspects this invention relates to a card holder comprising a single-piece transparent material having a rear face and folded therefrom and in close proximity thereto a front face; and projecting from the end of one of said faces a section of said transparent material adapted to engage with the body of a camera.

The projecting section is adapted to engage the camera at a convenient attachment point. It projects at an angle away from the faces, preferably at about a perpendicular angle. For instance, a hole may be provided in the projecting section into which a standard tripod screw (sometimes informally called a "tripod nut") can be placed as it is threaded into the tripod socket or mounting of a camera. The screw of a camera cover functions similarly. The tripod screw can be disirably provided in many cameras including the underwater Nikonos III camera.

In some cameras such as the Nikonos II, which is also suitable for underwater photography, the tripod socket can be an integral part of the camera operation, for instance a part of flash synchronization cover, so that flash photography would not be possible if the instruction card holder were attached to a camera at the tripod socket. In such cases the projecting section can be shaped and positioned to fit into an accessory shoe or flash attachment (i.e. the "accessory shoe" or for electronic flash units, the "hot shoe"), typically on the top of the camera body. Where the attachment is at the shoe it would still be possible to use auxillary viewfinders on the camera, if desired, by placing an accessory shoe on the instruction card holder in a "piggyback" manner.

The single-piece instruction card holder could be attached to other parts of the camera body as well, possibly with modification of the camera body to accommodate receipt to the projecting section.

The invention can be further understood from the drawings which illustrate embodiments of the invention.

FIG. 4 is a perspective view of an alternative instruction card holder embodiment having a projection which is attached to a camera at its flash attachment shoe or accessory shoe.

FIG. 5 is a side elevational section view of the instruction card holder of FIG. 4.

FIG. 6 is a top plan view of the instruction card holder of FIG. 4.

FIG. 7 is a front elevational view of a portion of the front face of the instruction card holder behind which an instruction card is partially inserted.

FIG. 8 is a front elevational view of a modification of FIG. 7 in which projections are present on the front face into which the instruction card can be placed in register.

FIG. 9 is a front elevational view of a modification of FIG. 7 in which a pin is provided for insertion into a hole in the front face in order to improve securing a card in the holder.

DESCRIPTION OF PREFERRED EMBODIMENTS

Figure 1:
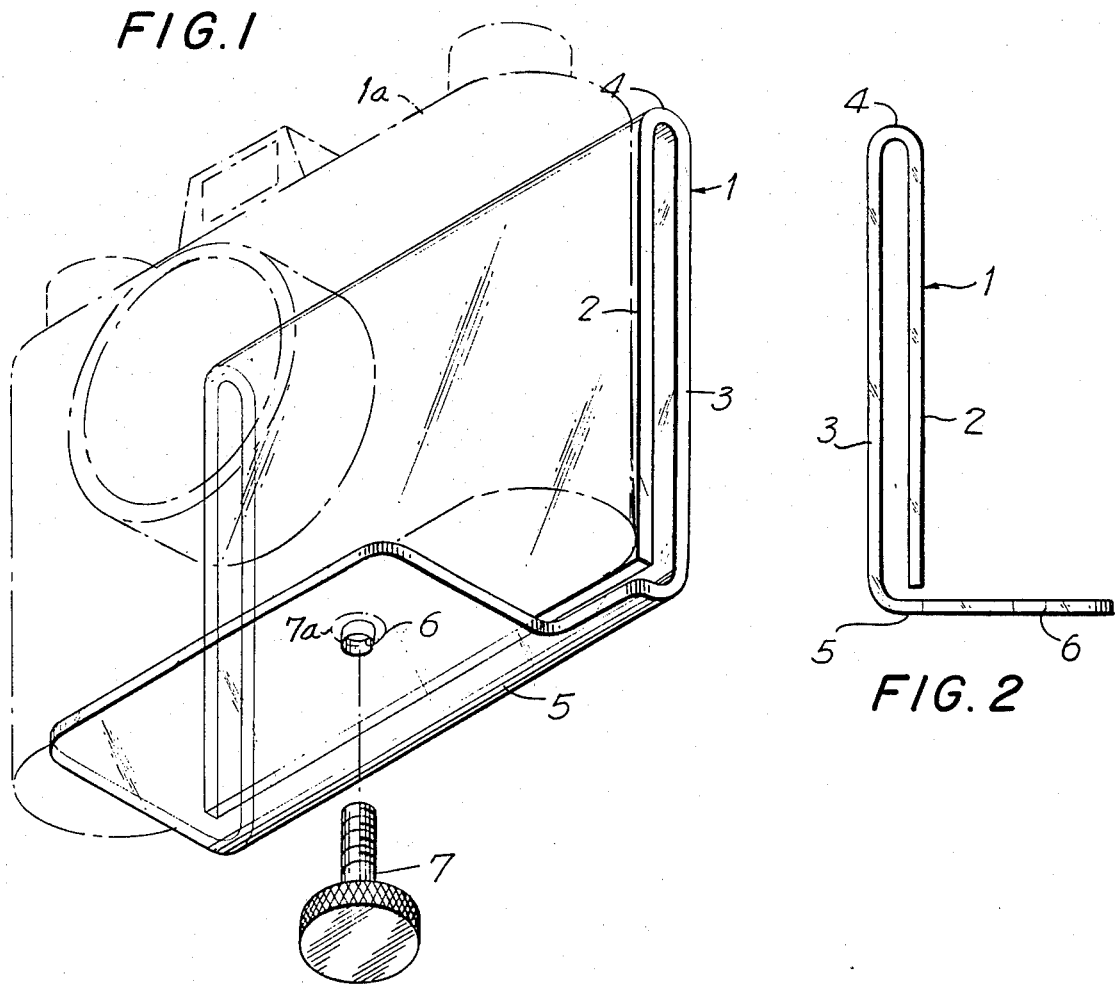
FIG. 1 is a perspective view of an instruction card holder embodiment having a projection positioned for attachment to a camera at its tripod socket.

Preferred embodiments are particularly illustrated in the drawings.

Figure 2:
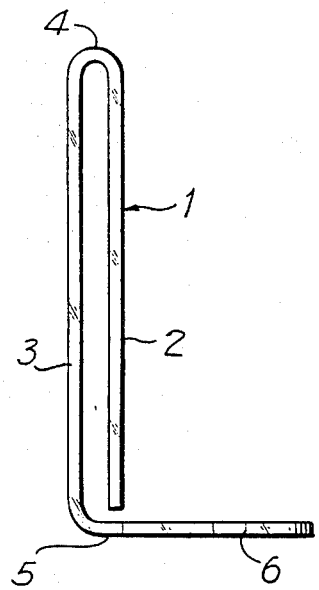
FIG. 2 is a side elevational section view of the instruction card holder of FIG. 1.
Figure 3:
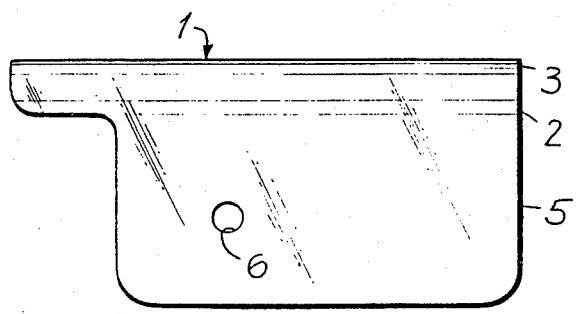
FIG. 3 is a top plan view of the instruction card holder of FIG. 1.

Referring particularly to FIGS. 1-3, the device indicated generally as 1 is a transparent material, typically a resilient, synthetic plastic such as polyacrylate, polymethacrylate, polycarbonate, cellulose acetate, polyvinyl acetate, polyvinyl chloride or polyethylene. Thermoplastic resins commercially available under the trademarks "Plexiglas", "Lexan", "Vinylite", and "Lucite" are examples of plastics which may be employed.

The device 1 comprises a rear face 2 which is typically rectangularly shaped in order to be positioned directly against the back of the camera 1a. The front face 3 is folded away from the rear face 2 and is in close proximity thereto. The tolerance between the faces is such as to permit convenient insertion and retention of cards. Thus, the tolerance of FIGS. 1-3 (and also FIGS. 4-6) can vary from the scale shown. The fold is depicted as 4 at the top of the device. Preferably the shape of the front face 3 matches the shape of the rear face 2 so that an instruction card can be conveniently inserted between the two faces.

The front face 3 projects lower than the rear face 2 and there projects away from the faces 2 and 3, from the bottom of the front face 3 and below the rear face 4 a section 5 of the transparent material having a hole 6 positioned to receive a tripod screw 7 which can be inserted through the hole 6 and then into a tripod socket 7a on the bottom of a camera 1a. As illustrated, projecting section 5 is substantially perpendicular to the faces 2 and 3. It is noted that alternately the projecting section could be from the rear face which could extend below the rear of a camera. However, preferably it is as depicted, from the front face so that an inserted instruction card can rest on the projecting section.

In FIGS. 1, 2 and 3 a portion of projecting section 5 is of diminished width in order to conserve material. However, if desired it could have the full width of the faces.

Referring particularly to the embodiment of FIGS. 4-6, the device indicated generally as 11 is a transparent material of the same type as indicated in FIGS. 1-3. The rear face 12 is again typically rectangularly shaped for positioning against the rear of a camera 1a, with the front face 13 folded away therefrom and in close proximity thereto. In this embodiment the fold 14 is on the bottom of the device.

The front face 13 extends higher than the rear face 12 and there projects therefrom over rear face 12 a projecting section 15 shaped and positioned for insertion in a flash attachment shoe or accessory shoe 15a on a camera 1a. As illustrated, projecting section 15 is substantially perpendicular to the faces 12 and 13. It is noted that alternatively the rear face could extend higher and the projecting section which could be inserted in the flash attachment or accessory shoe could project from the rear face.

FIGS. 7-9 relate particularly to the instruction cards and their insertion in the device. In FIG. 7 a card 21 is shown partially inserted behind front face 3 of FIGS. 1-3 (or alternatively 13 of FIGS. 4-6). The card could rest on the perpendicular section of FIGS. 1-3 or the fold of FIGS. 4-6. It preferably has less height than the transparent device so that if the transparent device should be in front of a camera viewfinder (not shown), as it would likely be in the embodiment of FIGS. 4-6, the scene to be photographed can be conveniently positioned.

FIG. 8 depicts a modification of FIG. 7 in which the card 21, partially inserted behind fold face 3 contains slight depressions 22 which upon complete insertion are in register with complementary projections 23 from the front face. It is apparent that registration may be attained with one or more registration points. Alternatively, the rear of the card and the rear face of the device can be designed for registration. Likewise, if desired the projections could be on the card and depressions for registration on either of the faces. Such depressions may be completely through the card as holes therein.

FIG. 9 depicts an alternative modification of FIG. 7 in which a hole 24 is present on front face 3 and a pin 25 is attached to the front face. When card 21 with depressions 26 is inserted behind the front face (it is shown as partially inserted in FIG. 9) registration can be secured by placing the pin 25 through hole 24 into depression 26. If desired, there may be a plurality of holes on the front face, pins for insertion therein and registration depressions in the card. The depressions in the card may be completely through the card as holes therein.

The instruction cards may be made on any convenient material, e.g. cardboard, plastic, or metal. Plastic, metal or other waterproof material are particularly desirable when it is intended that the device be attached to a camera for underwater photography. Especially for underwater photography the card background and/or instruction material thereon may be contrastingly pigmented to each other in order to simplify reading.

The card holder may be prepared by shaping the resilient transparent plastic with bends and projecting section and hole, if present, by conventional means.

The foregoing description is illustrative and further obvious modifications and equivalents thereof are not intended to be excluded from the invention.

I claim:

1. In a combination of a camera having a tripod socket to receive a tripod screw and a card holder suitable for attachment to said camera at said tripod socket, the improvement in which said card holder comprises a single-piece transparent material with two faces and a projection, having a rear face and folded from the top therefrom and in close proximity thereto a front face; and a section of said transparent material projection being substantially perpendicular to and rearward from the bottom of said front face and below said rear face, said section containing one complete circle hole in its midst, which hole is positioned to receive a tripod screw of a camera.

2. The combination claimed in claim 1 wherein said projecting section projects rearwardly from the front face of said card holder.

3. The combination claimed in claim 1 wherein said transparent material is a resilient, synthetic plastic.

4. The combination claimed in claim 1 wherein a face thereof contains at least one registration point to secure registration with a card which can be inserted between said faces.

5. The combination claimed in claim 1 wherein said front face has at least one hole therein and there is attached to said front face at least one pin which can be inserted in said hole to secure registration with a card which can be inserted between said faces.

6. A combination wherein said card holder is as claimed in claim 4 and said card has complementary registration points with said at least one registration point.

7. A combination as claimed in claim 6 wherein said card is composed of waterproof material.

8. A combination wherein said card holder is as claimed in claim 5 and said card has a complementary registration point with at least one hole on said front face.

9. In a combination of a camera having a flash attachment shoe and a card holder suitable for attachment to said camera at said flash attachment shoe, the improvement in which said card holder comprises a single-piece transparent material with two faces and a projection, having a front face; and a section of said transparent material projecting substantially perpendicular to the top of one of said faces, which section has a shape suitable for fit into the flash attachment shoe of a camera.

* * * * *

UNITED STATES PATENT AND TRADEMARK OFFICE
CERTIFICATE OF CORRECTION

PATENT NO. : 4,301,608
DATED : November 24, 1981
INVENTOR(S) : Herbert N. Taylor, Jr.

It is certified that error appears in the above-identified patent and that said Letters Patent are hereby corrected as shown below:

Cover page, left column, correct the address of the inventor to --830 Arthur Street, West Hempstead, New York 11552--

Signed and Sealed this

Twentieth Day of July 1982

[SEAL]

Attest:

GERALD J. MOSSINGHOFF

Attesting Officer     Commissioner of Patents and Trademarks